United States Patent
Mustafa et al.

(10) Patent No.: US 12,276,344 B2
(45) Date of Patent: Apr. 15, 2025

(54) SELF-ADJUSTABLE VARIABLE ORIFICE CHECK VALVE FOR BACK PRESSURE REDUCTION

(71) Applicant: Applied Materials, Inc., Santa Clara, CA (US)

(72) Inventors: Muhannad Mustafa, Milpitas, CA (US); Sanjeev Baluja, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 26 days.

(21) Appl. No.: 18/212,238

(22) Filed: Jun. 21, 2023

(65) Prior Publication Data
US 2023/0407981 A1    Dec. 21, 2023

Related U.S. Application Data

(60) Provisional application No. 63/354,033, filed on Jun. 21, 2022.

(51) Int. Cl.
*F16K 15/02* (2006.01)
*F16K 17/04* (2006.01)

(52) U.S. Cl.
CPC ........ *F16K 15/028* (2013.01); *F16K 17/0413* (2013.01)

(58) Field of Classification Search
CPC ........ F16K 15/028; F16K 15/10; F16K 17/34; F16K 17/0413
See application file for complete search history.

(56) References Cited

U.S. PATENT DOCUMENTS

| | | | |
|---|---|---|---|
| 4,341,090 A | 7/1982 | Ramakrishnan | |
| 5,067,389 A | 11/1991 | St. Germain | |
| 5,277,664 A | 1/1994 | Mott | |
| 8,950,201 B2 | 2/2015 | Voorhis | |

FOREIGN PATENT DOCUMENTS

| | | | |
|---|---|---|---|
| CN | 1301388 A | | 6/2001 |
| CN | 111350849 A | | 6/2020 |
| GB | 250856 A | * | 5/1925 |
| JP | H05215260 A | | 8/1993 |
| JP | 2002071403 A | | 3/2002 |
| KR | 102218406 B1 | | 2/2021 |

OTHER PUBLICATIONS

PCT International Search Report and Written Opinion in PCT/US2023/025804 mailed Oct. 11, 2023, 11 pages.

* cited by examiner

*Primary Examiner* — Kelsey E Cary
(74) *Attorney, Agent, or Firm* — Servilla Whitney LLC

(57) ABSTRACT

Variable orifice check valves comprising a flange with a guide pin, spring and movable plate are described. The flange has a body with at least one guide pin opening in the top surface. A guide pin is positioned within the at least one guide pin opening and a spring is positioned around the guide pin. The movable plate has an opening and slides along the guide pins with the spring between the top surface of the flange body and the bottom surface of the movable plate.

17 Claims, 7 Drawing Sheets

SELF-ADJUSTABLE VARIABLE ORIFICE CHECK VALVE FOR BACK PRESSURE REDUCTION

CROSS-REFERENCE TO RELATED APPLICATIONS

This application claims priority to U.S. Provisional Application No. 63/354,033, filed Jun. 21, 2022, the entire disclosure of which is hereby incorporated by reference herein.

TECHNICAL FIELD

Embodiments of the disclosure generally relate to apparatus for controlling back pressure. In particular, embodiments of the disclosure relate to high flow check valves to reduce turbo pump back stream due to fore line pressure fluctuations and methods for use.

BACKGROUND

Semiconductor manufacturing using many low-pressure processes in specially designed processing chambers. These processing chambers are frequently subjected to pumping and purging processes to maintain suitable processing conditions. During formation of electronic devices, the process chamber may be subjected to a low-pressure purge to change process gases or for other purposes. Low-pressure purge of the process chambers tends to increase the diffusion rate for residues/byproducts from the trench/via portions of electronic devices.

Fore line pressure also experiences cycling following chamber pressure. During rapid drops in chamber pressure, the fore line pressure increases due to increasing pumping throughput. Sudden pressure surges in the fore line can result which create back pressure on the turbo-molecular pumps used in many processing chambers. Since turbo-molecular pumps only operate at low pressure (<1 Torr), back pressure will cause vibrations and ultimately lead to pump damage.

Accordingly, there is a need for apparatus and methods to reduce back pressure to the turbo-molecular pumps during pressure cycling.

SUMMARY

One or more embodiments of the disclosure are directed to variable orifice check valves comprising a flange, a guide pin, a spring, and a movable plate. The flange has a body with a top surface and a bottom surface defining a thickness of the flange body. The flange has an outer peripheral face and an orifice extending through the thickness of the body. At least one guide pin opening is in the top surface of the body. A guide pin is in each of the at least one guide pin openings. Each guide pin has an elongate shaft at a top portion. The spring is positioned around the elongate shaft of each guide pin. The movable plate has a top surface and a bottom surface defining a thickness of the movable plate. At least one guide pin opening extends through the thickness of the movable plate. The movable plate is positioned so that the at least one guide pin extends through the at least one guide pin opening with the spring between the top surface of the flange body and the bottom surface of the movable plate.

Additional embodiments are directed to variable orifice check valves comprising a flange, a guide pin, a spring, and a movable plate. The flange has a body with a top surface and a bottom surface defining a thickness of the flange body, an outer peripheral face and an orifice extending through the thickness of the flange body. Two guide pin openings are in the top surface of the body. The outer peripheral face of the flange body has a concave surface. A guide pin is in each of the guide pin openings and each guide pin has an elongate shaft at a top portion. A spring is positioned around the elongate shaft of each guide pin. The movable plate has a top surface and a bottom surface defining a thickness of the movable plate. The guide pin openings extend through the thickness of the movable plate. The movable plate is positioned so that the guide pins extend through the guide pin openings with the spring between the top surface of the flange body and the bottom surface of the movable plate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

As used in this specification and the appended claims, the term "substrate" refers to a surface, or portion of a surface, upon which a process acts. It will also be understood by those skilled in the art that reference to a substrate can also refer to only a portion of the substrate, unless the context clearly indicates otherwise. Additionally, reference to depositing on a substrate can mean both a bare substrate and a substrate with one or more films or features deposited or formed thereon One or more embodiments of the disclosure advantageously provide apparatus and methods for reducing back pressure fluctuations on a vacuum pump positioned downstream of a processing chamber. Some embodiments of the disclosure provide variable orifice check valves. Some embodiments of the disclosure advantageously self-adjust to changes in pressure. Some embodiments of the variable orifice check valve have a valve conductance that changes based on flow rate and self-adjust to compensate. Some embodiments of the variable orifice check valve have a simple design and are relatively inexpensive. The variable orifice check valve of some embodiments can be added to a turbo pump fore line as flow capacitance.

The variable orifice check valve of some embodiments comprises a moving plate, spring and guide pin. The moving plate of some embodiments regulates line pressure by changing Cv based on flow rate. The variable orifice valve operates at unidirectional flow. The plate moves along the guide pins. The spring ensures Cv change is proportional to the inlet and outlet pressure difference. The valve of some embodiments acts as a variable orifice and can be implemented in various types of fittings including, but not limited to, KF, ISO, VCR.

Figure 1:
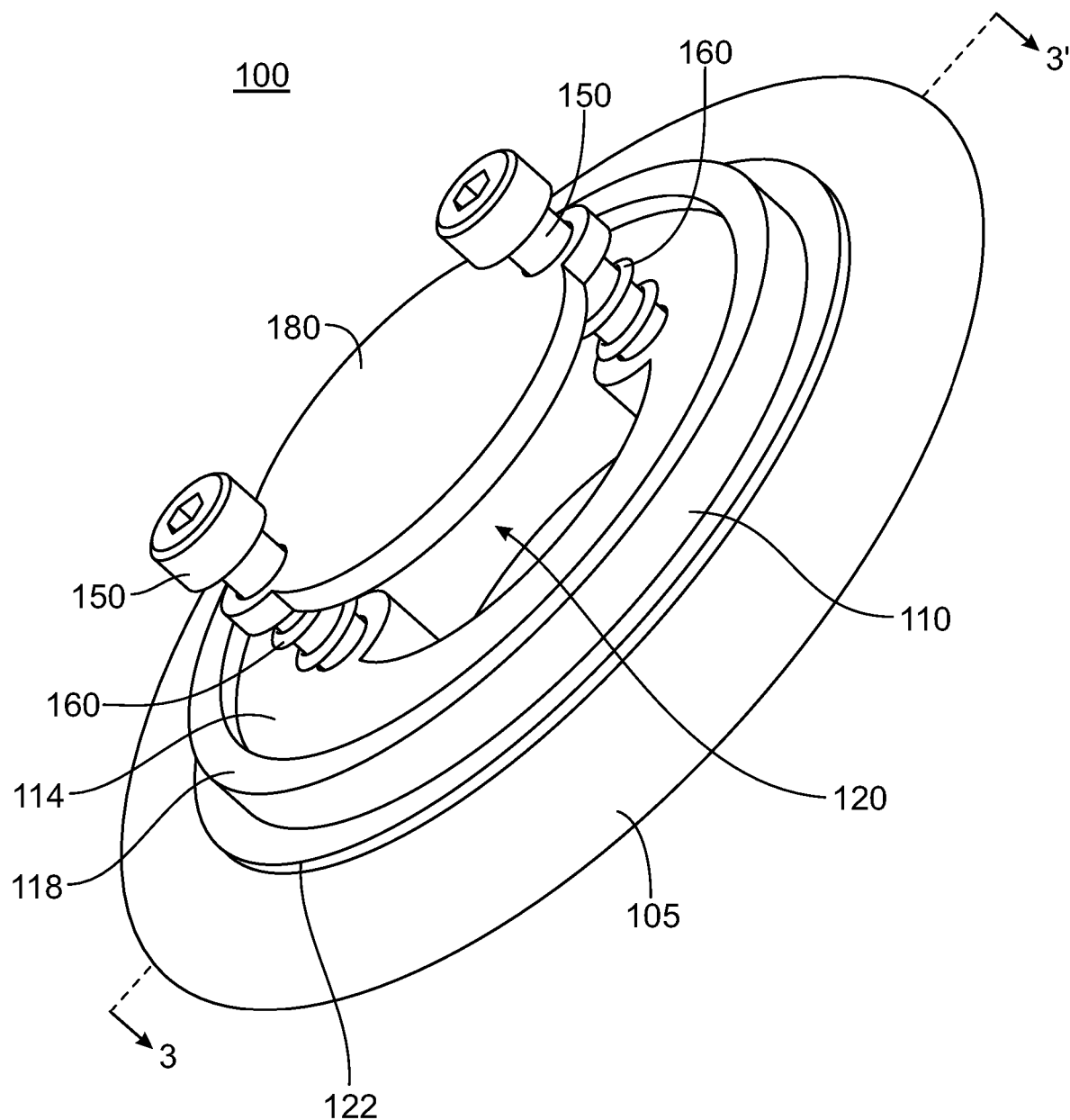
FIG. 1 shows an orthographic view of a variable orifice check valve according to one or more embodiment of the disclosure.
Figure 2:
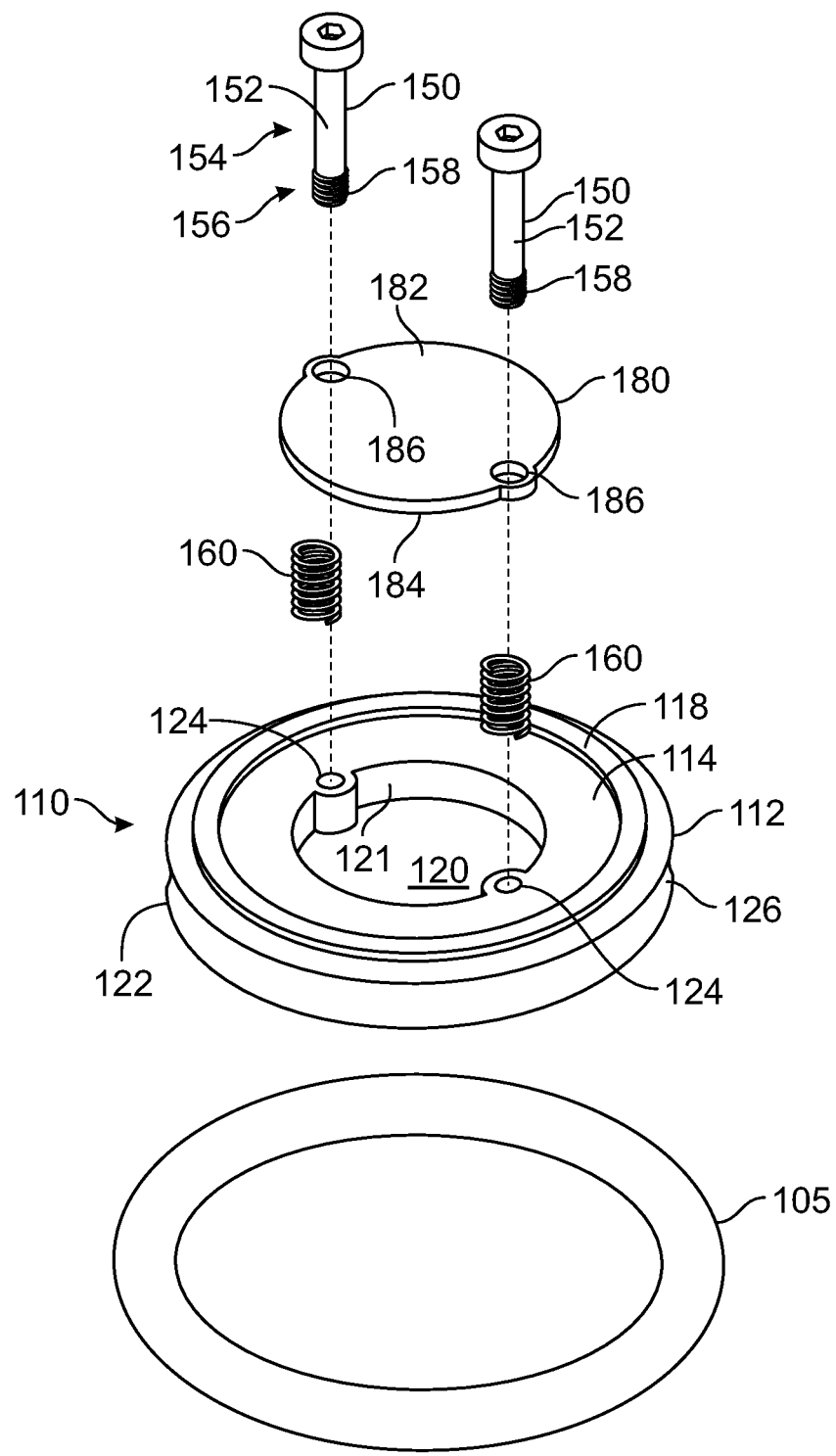
FIG. 2 shows an exploded view of the variable orifice check valve of FIG. 1.
Figure 3:
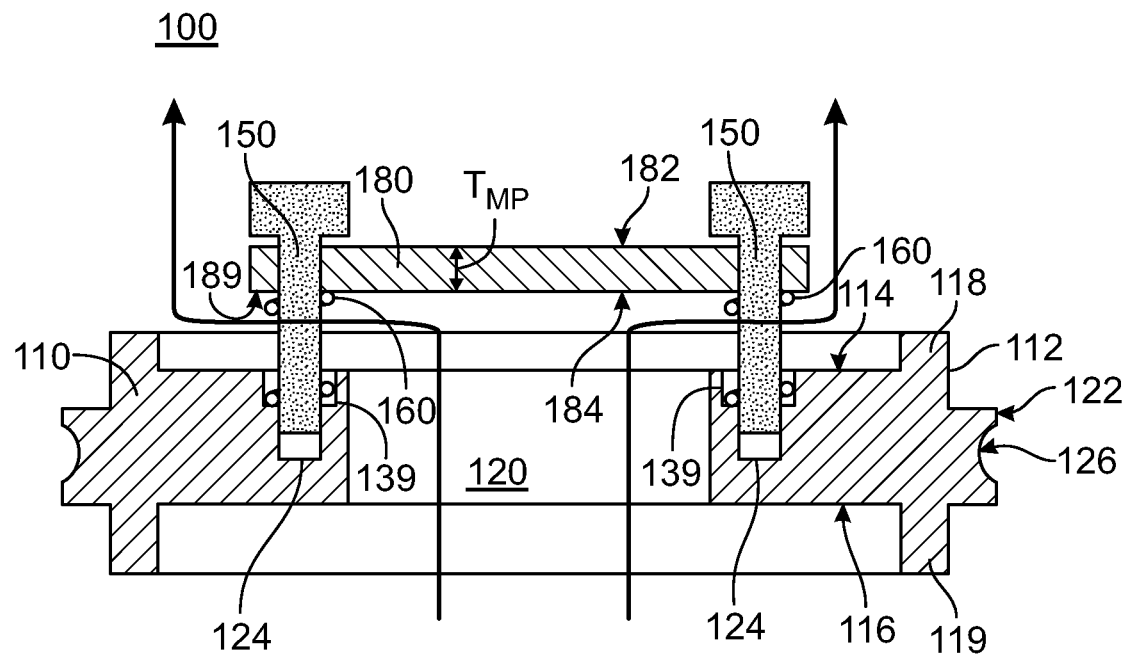
FIG. 3 shows a cross-sectional view of the variable orifice check valve of FIG. 1 in the open position taken along line 3-3'.
Figure 4:
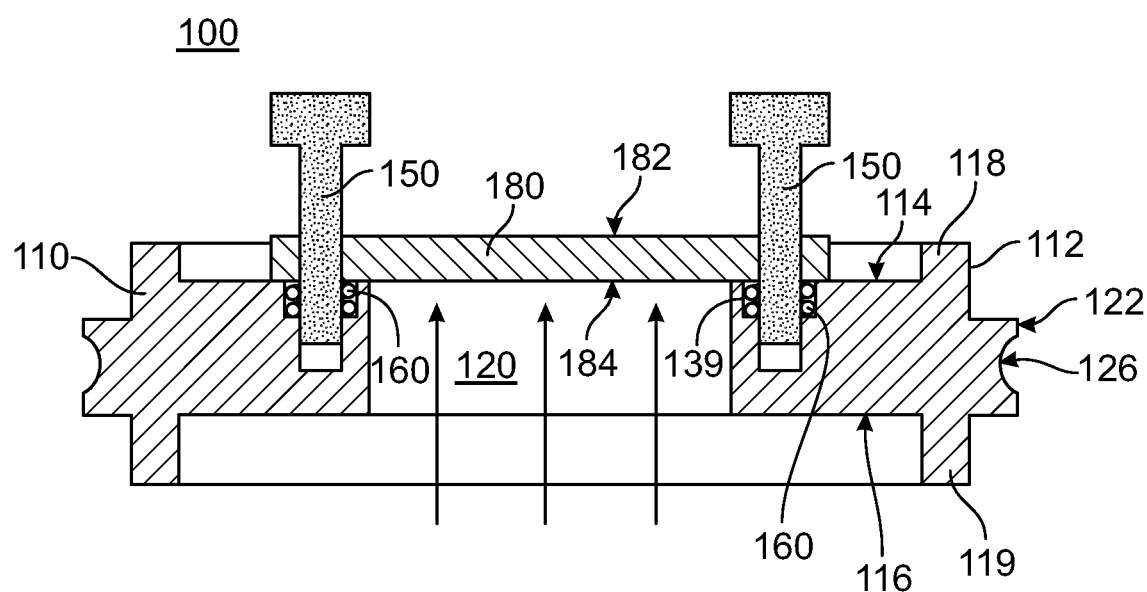
FIG. 4 shows a cross-sectional view of the variable orifice check valve of FIG. 1 in the closed position taken along line 3-3'.

FIG. 1 illustrates an orthographic view of a variable orifice check valve 100 according to one or more embodiment of the disclosure. FIG. 2 illustrates an exploded view of the variable orifice check valve 100 of FIG. 1. FIGS. 3 and 4 illustrate cross-sectional views of the variable orifice check valve 100 of FIG. 1 taken along line 3-3' in the open and closed positions, respectively. The line shading illustrated in the Figures is used to help distinguish the different components and should not be interpreted as referring to any specific material of construction. The variable orifice check valve 100 comprises a flange 110, at least one guide pin 150, at least one compression element 160 (also referred to as a spring) and a movable plate 180.

Figure 5:
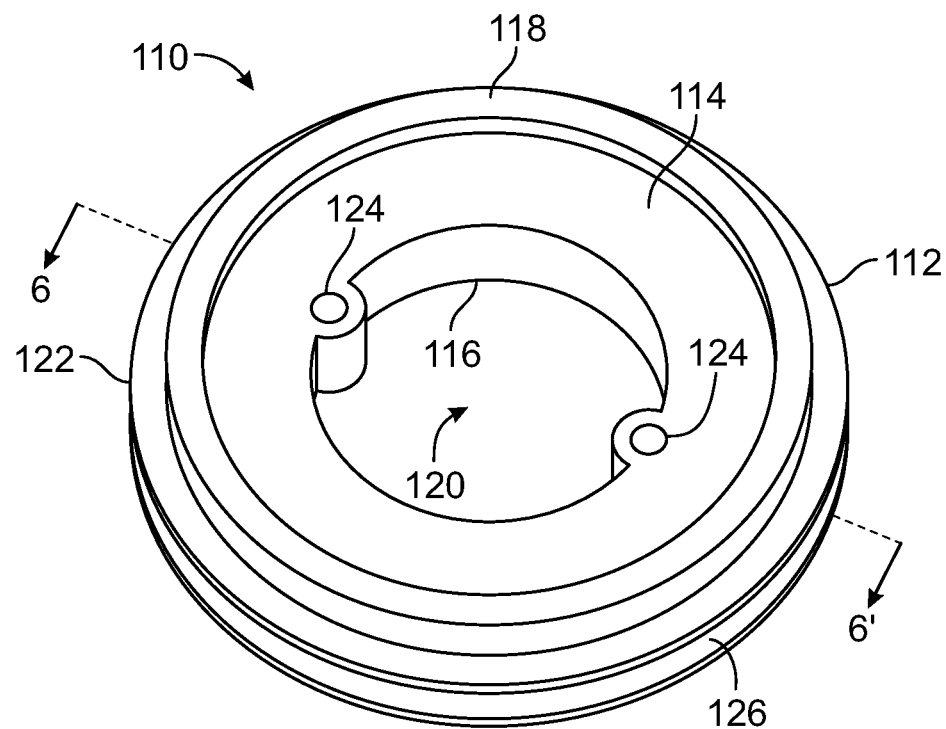
FIG. 5 shows an isometric view of a flange of a variable orifice check valve according to one or more embodiment of the disclosure.
Figure 6:
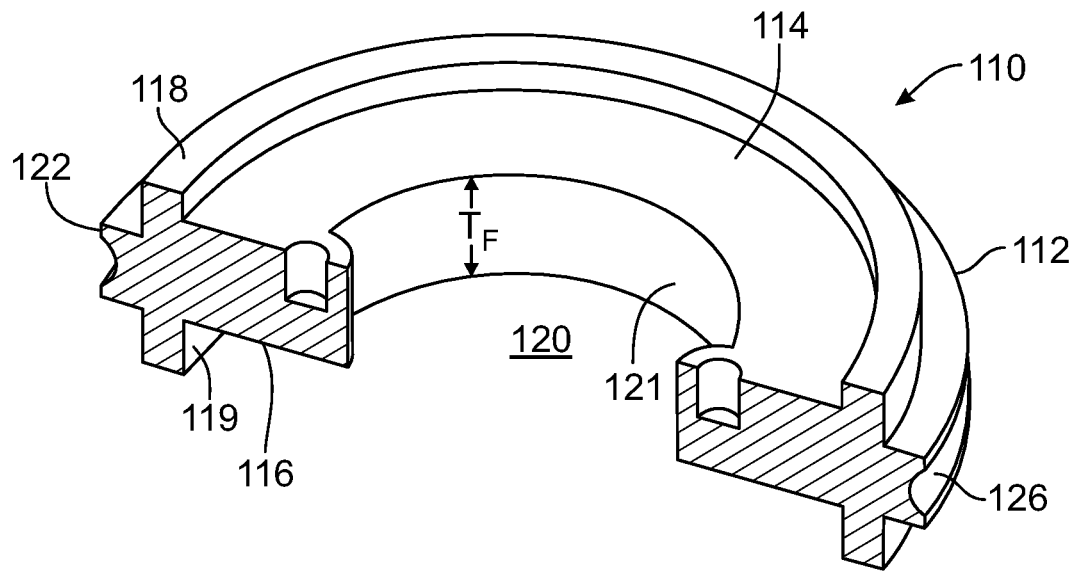
FIG. 6 shows a cross-sectional view of the flange of FIG. 5 taken along line 6-6'.

FIG. 5 shows an isometric view of the flange 110 shown in FIG. 1. FIG. 6 shows a cross-sectional view of the flange 110 of FIG. 5 taken along line 6-6'. The flange 110 has a body 112 with a top surface 114 and a bottom surface 116 defining a thickness $T_F$ of the flange 110. The body 112 includes an outer peripheral face 122 and an orifice 120 that extends through the thickness $T_F$ of the flange body 112.

The flange 110 can be made of any suitable material. In some embodiments, the flange 110 comprises stainless steel or aluminum.

The thickness $T_F$ of the flange 110 can be any suitable thickness depending on, for example, the overall size of the valve 100, the expected pressures, etc. In some embodiments, the flange 110 has a thickness $T_F$ in the range of 0.1 inch to 1 inch, or in the range of 0.15 inches to 0.75 inches, or in the range of 0.25 inches to 0.5 inches.

The flange 110 illustrated in the Figures has an upper rim 118 and a lower rim 119 that extend from the top surface 114 and the bottom surface 116, respectively. The presence of the upper rim 118 and/or lower rim 119 is not considered when determining the thickness $T_F$ of the flange 110. The thickness $T_F$ is measured at the periphery of the orifice 120 or at the orifice face 121

Figure 7:
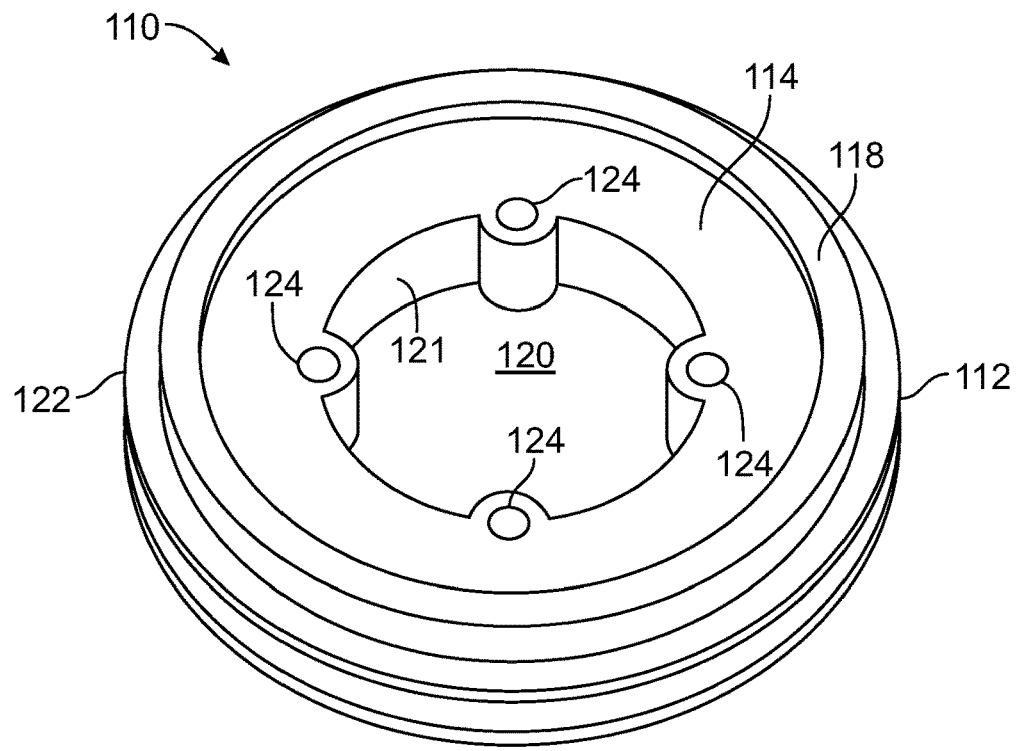
FIG. 7 shows an alternate flange for a variable orifice check valve according to one or more embodiment of the disclosure.
Figure 8:
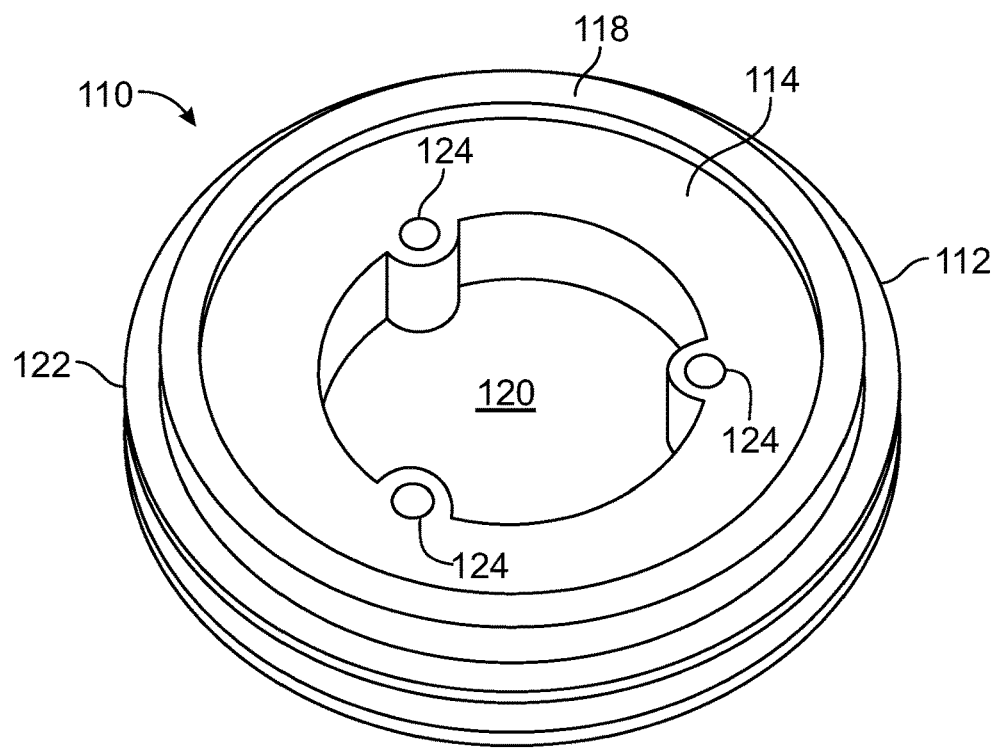
FIG. 8 shows an alternate flange for a variable orifice check valve according to one or more embodiment of the disclosure.

At least one guide pin opening 124 is in the top surface 114 of the body 112. The embodiment illustrated in FIGS. 1 through 6 have two guide pin openings 124 in the top surface 114 of the body 112 of the flange 110. However, the skilled artisan will recognize that there can be any suitable number of guide pin openings 124. FIG. 7 illustrates an embodiment in which the flange 110 has four guide pin openings 124 in the top surface 114 of the body 112. FIG. 8 illustrates an embodiment in which the flange 110 has three guide pin openings 124 in the top surface 114 of the body 112. The guide pin openings 124 of the illustrated embodiments are spaced equidistantly from the central axis of the flange 110, or spaced equidistantly around the orifice 120. However, the skilled artisan will recognize that the spacing of the guide pin openings 124, and any associated components, does not need to be uniform. For example, the guide pin openings can be arranged in a rectangular pattern around the central axis of the flange 110.

Figure 9:
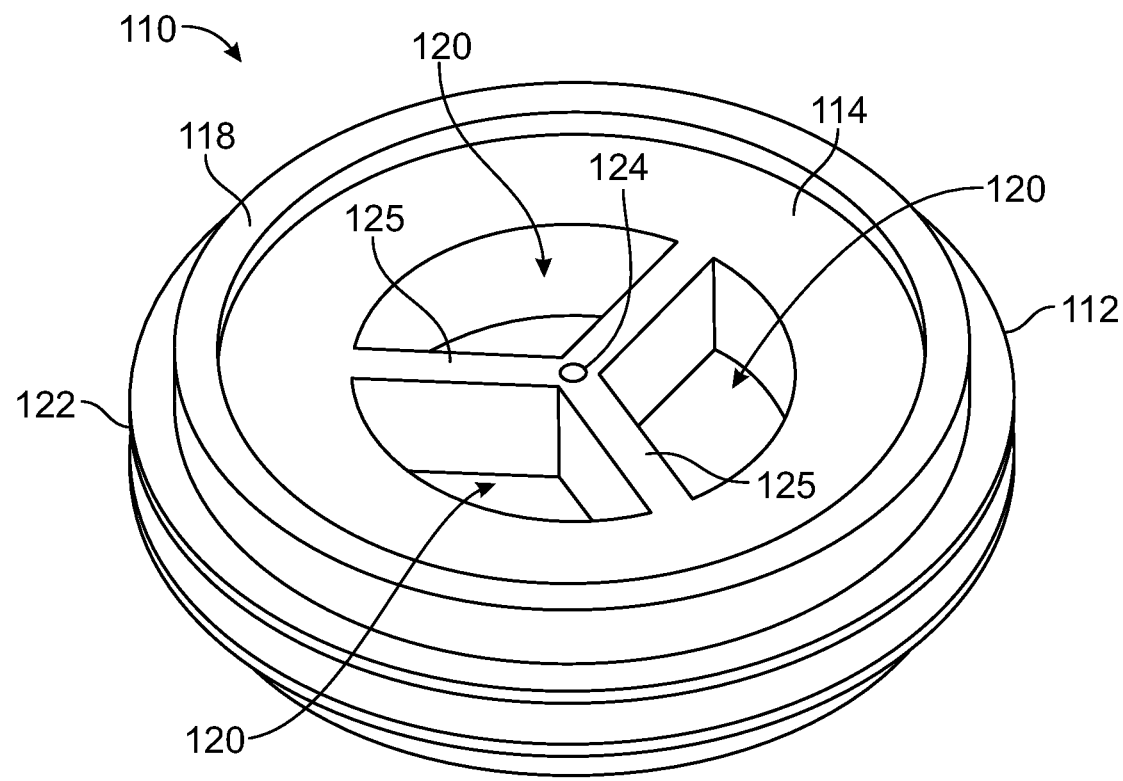
FIG. 9 shows an alternate flange for a variable orifice check valve according to one or more embodiment of the disclosure.

FIG. 9 illustrates another embodiment of the flange 110 in which there is one guide pin opening 124. In this embodiment, there are three spokes 125 arranged around the orifice 120 and the guide pin opening 124 is located at the intersection of the spokes 125.

In some embodiments, the outer peripheral face 122 of the flange body 112 comprises a concave surface 126. In some embodiments, as shown in FIGS. 1 and 2, an O-ring 105 is positioned within the concave surface 126 of the outer peripheral face 122 of the flange body 112.

Referring back to FIGS. 1 through 4, a guide pin 150 is positioned in each of the guide pin openings 124. Each guide pin 150 has a top portion 154 and a bottom portion 156. The top portion 154 has an elongate shaft 152 and the bottom portion 156 of the illustrated embodiment has screw threads 158. The screw threads 158 of the bottom portion 156 of the guide pin 150 of some embodiments are configured to engage with complementary screw threads (not shown) on the inside of the guide pin opening 124.

A spring 160 is positioned around the elongate shaft 152 of each guide pin 150. As used in this manner, the term spring refers to any suitable compression element known to the skilled artisan, and is not limited to the traditional metal coil spring. Any component that has a suitable spring constant can be used.

Referring again to FIGS. 1 through 4, the valve 100 includes a movable plate 180. The movable plate 180 has a top surface 182 and a bottom surface 184 that define the thickness $T_{MP}$ of the movable plate. The movable plate 180 can be any suitable thickness. In some embodiments, the movable plate 180 has a thickness in the range of 0.05 inches to 0.25 inches, or in the range of 0.1 inches to 0.2 inches.

The movable plate 180 has at least one guide pin opening 186 extending through the thickness of the movable plate 180. The movable plate 180 is positioned so that the at least one guide pin 150 extends through the at least one guide pin opening 186 of the movable plate 180 into the at least one guide pin opening 124 in the flange 110 with the spring 160 between the top surface 114 of the flange 110 and the bottom surface 184 of the movable plate 180.

In some embodiments, there are two guide pin openings 124, two guide pins 150, two springs 160 and two guide pin openings 186 in the movable plate 180. In some embodiments, the guide pin openings 124 are arranged on opposite sides of the body 112 of the flange 110.

In some embodiments, there are three guide pin openings 124, three guide pins 150, three springs 160 and three guide pin openings 186 in the movable plate 180. In some embodiments, the three guide pin openings 124 are arranged symmetrically around the central axis of the flange 110.

In some embodiments, there are four guide pin openings 124, four guide pins 150, four springs 160 and four guide pin openings 186 in the movable plate 180. In some embodiments, the four guide pin openings 124 are arranged symmetrically around the central axis of the flange 110. In some embodiments, the four guide pin openings 124 are arranged in a rectangular manner around the central axis of the flange 110.

Figure 10:
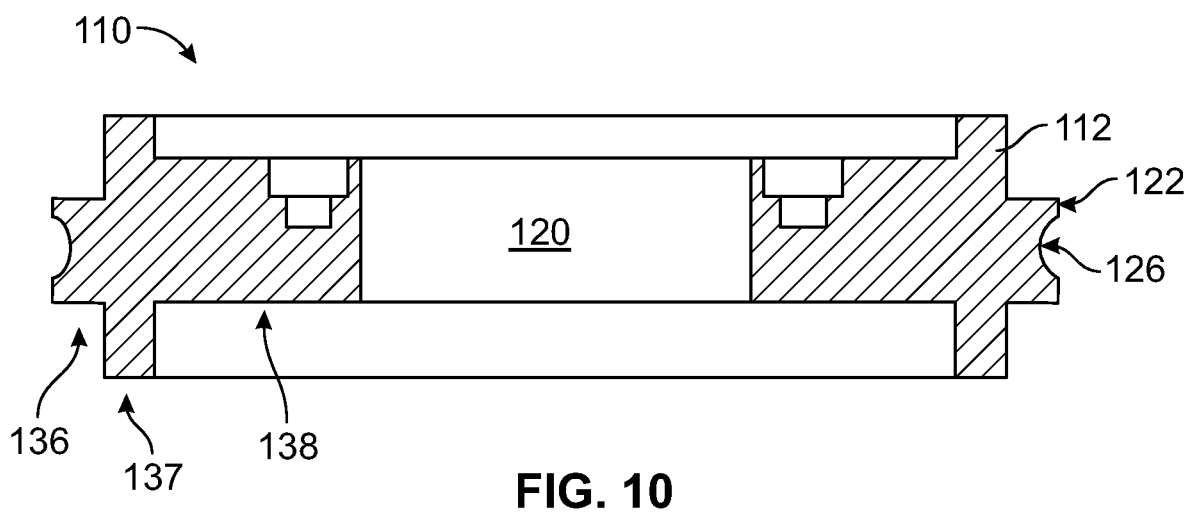
FIG. 10 shows a cross-sectional view of a flange according to one or more embodiment of the disclosure.

FIG. 10 shows a cross-sectional view of the flange 110 taken along line 3-3' of FIG. 1. The flange body 112 has an outer ring portion 136, a middle ring portion 137 and an inner ring portion 138. The middle ring portion 137 has a greater thickness than the inner ring portion 138. The middle ring portion 137 shown includes the upper rim 118 and lower rim 119 as described herein. The concave surface 126 of the outer peripheral face 122 is located in the outer ring portion 136.

Referring to FIGS. 3 and 4, the use of the valve 100 is illustrated. When the pressure at the back side of the flange 110 (adjacent the bottom surface 116) is greater than the spring force of spring 160 and the pressure at the front side of the flange 110 (adjacent the top surface 114), the movable plate 180 is spaced a distance from the front surface 114. This allows a flow of gas to pass through the orifice 120 and around the edges of the movable plate 180, as shown in FIG. 3. When the pressure on the front side of the flange 110 is greater than on the back side of the flange 110, factoring in the spring constant, the movable plate 180 seals against the flange, effectively cutting off the orifice 120 and preventing flow, as shown in FIG. 4. While the flow shown in FIGS. 3 and 4 moves from the back side to the front side of the flange 110, the skilled artisan will recognize that the valve 100 can be reversed relative to the flow.

In some embodiments, as shown in FIG. 4, the movable plate 180 is sized to fit within the middle ring portion 137 of the flange body 110 when the bottom surface 184 of the movable plate 180 is in contact with the top surface 114 of the flange body 112.

In some embodiments, as shown in FIGS. 3 and 4, the at least one spring 160 sits within a spring recess 139 in the top surface 114 of the flange body 112 around the guide pin opening 124. The spring recess 139 of some embodiments has a sufficient depth so that when the spring 160 is completely compressed, an outer peripheral region 189 of the bottom surface 184 of the movable plate 180 contacts the top surface 114 of the flange body 112.

Figure 11:
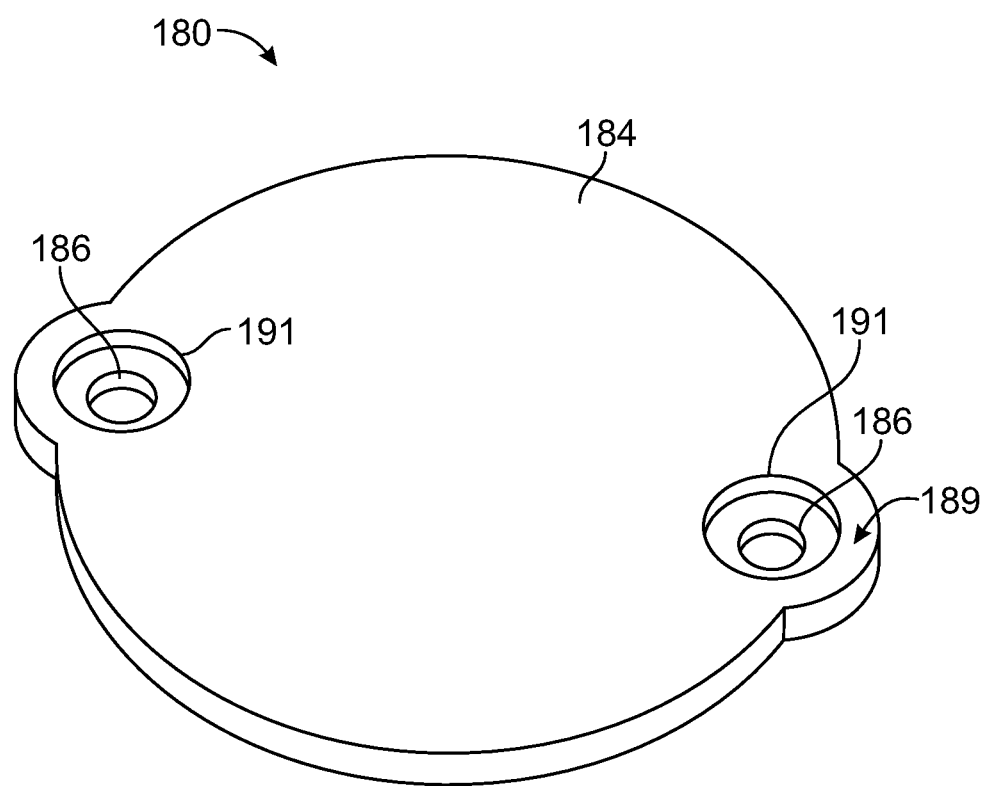
FIG. 11 shows a bottom isometric view of a movable plate for a variable orifice check valve according to one or more embodiment of the disclosure.

FIG. 11 shows a bottom view of a movable plate 180 according to one or more embodiment of the disclosure. In some embodiments, the at least one spring 160 sits within a spring recess 191 formed in the bottom surface 184 of the movable plate 180 around the guide pin openings 186. In some embodiments, the spring recess 191 has a sufficient depth so that when the spring 160 is completely compressed, an outer peripheral region 189 of the bottom surface 184 of the movable plate 180 contacts the top surface 114 of the flange body 112.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:

1. A variable orifice check valve comprising:
   a flange having a body with a top surface and a bottom surface defining a thickness of the flange body, an outer peripheral face and an orifice extending through the thickness of the flange body, at least one guide pin openings in the top surface of the body, the flange body having an outer ring portion, a middle ring portion and an inner ring portion, the middle ring portion having a greater thickness than the inner ring portion;
   a guide pin in each of the at least one guide pin openings, each guide pin having an elongate shaft at a top portion;
   a spring positioned around the elongate shaft of each guide pin; and
   a movable plate having a top surface and a bottom surface defining a thickness of the movable plate, at least one guide pin openings extending through the thickness of the movable plate, the movable plate positioned so that the at least one guide pins extend through the at least one guide pin openings with the spring between the top surface of the flange body and the bottom surface of the movable plate, the movable plate is sized to fit within the middle ring portion of the flange body when the bottom surface of the movable plate is in contact with the top surface of the flange body.

2. The variable orifice check valve of claim 1, wherein the outer peripheral face of the flange body comprises a concave surface.

3. The variable orifice check valve of claim 2, further comprising an O-ring positioned within the concave surface of the outer peripheral face of the flange body.

4. The variable orifice check valve of claim 1, wherein there are two guide pin openings, two guide pins, two springs and two guide pin openings in the movable plate.

5. The variable orifice check valve of claim 4, wherein the guide pin openings are arranged on opposite sides of the body.

6. The variable orifice check valve of claim 1, wherein there are three guide pin openings, three guide pins, three springs and three guide pin openings in the movable plate.

7. The variable orifice check valve of claim 1, wherein there are four guide pin openings, four guide pins, four springs and four guide pin openings in the movable plate.

8. The variable orifice check valve of claim 1, wherein the flange body has a thickness in the range of 0.25 inches to 0.5 inches.

9. The variable orifice check valve of claim 1, wherein the at least one spring sits within a spring recess formed in the top surface of the flange body around the guide pin openings.

10. The variable orifice check valve of claim 9, wherein the spring recess has a sufficient depth so that when the spring is completely compressed, an outer peripheral region of the bottom surface of the movable plate contacts the top surface of the flange body.

11. The variable orifice check valve of claim 1, wherein the at least one spring sits within a spring recess formed in the bottom surface of the movable plate around the guide pin openings.

12. The variable orifice check valve of claim 11, wherein the spring recess has a sufficient depth so that when the spring is completely compressed, an outer peripheral region of the bottom surface of the movable plate contacts the top surface of the flange body.

13. A variable orifice check valve comprising: a flange having a body with a top surface and a bottom surface defining a thickness of the flange body, an outer peripheral face and an orifice extending through the thickness of the flange body, two guide pin openings in the top surface of the body, the outer peripheral face of the flange body having a concave surface; a guide pin in each of the guide pin openings, each guide pin having an elongate shaft at a top portion; a spring positioned around the elongate shaft of each guide pin; a movable plate having a top surface and a bottom surface defining a thickness of the movable plate, the guide pin openings extending through the thickness of the movable plate, the movable plate positioned so that the guide pins extend through the guide pin openings with the spring between the top surface of the flange body and the bottom surface of the movable plate; and wherein the flange body has an outer ring portion, a middle ring portion and an inner ring portion, the middle ring portion having a greater thickness than the inner ring portion.

14. The variable orifice check valve of claim 13, further comprising an O-ring positioned within the concave surface of the outer peripheral face of the flange body.

15. The variable orifice check valve of claim 13, wherein the flange body has a thickness in the range of 0.25 inches to 0.5 inches.

16. The variable orifice check valve of claim 13, wherein the movable plate is sized to fit within the middle ring portion of the flange body when the bottom surface of the movable plate is in contact with the top surface of the flange body.

17. The variable orifice check valve of claim 13, wherein the springs sit within one or more of a spring recess formed in the top surface of the flange body around the guide pin openings, or a spring recess formed in the bottom surface of the movable plate around the guide pin openings.

* * * * *